(12) United States Patent
Suzuki

(10) Patent No.: US 8,651,557 B2
(45) Date of Patent: Feb. 18, 2014

(54) DOOR FRAME FOR VEHICLE

(71) Applicant: Aisin Seiki Kabushiki Kaisha, Kariya (JP)

(72) Inventor: Shunsuke Suzuki, Nishio (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/727,045

(22) Filed: Dec. 26, 2012

(65) Prior Publication Data

US 2013/0161976 A1 Jun. 27, 2013

(30) Foreign Application Priority Data

Dec. 27, 2011 (JP) ................... 2011-286720

(51) Int. Cl.
*B60J 5/04* (2006.01)
(52) U.S. Cl.
USPC ............... 296/146.2; 296/146.5; 296/146.6; 49/502
(58) Field of Classification Search
USPC ............ 296/201, 146.2, 146.3, 146.5, 146.6; 49/502
See application file for complete search history.

(56) References Cited

U.S. PATENT DOCUMENTS

| | | | | |
|---|---|---|---|---|
| 8,322,078 B2* | 12/2012 | Brancaleone et al. | ......... | 49/502 |
| 2003/0189357 A1* | 10/2003 | Patberg et al. | ............ | 296/146.6 |
| 2005/0102953 A1* | 5/2005 | Masunaga et al. | ............... | 52/633 |
| 2009/0152894 A1* | 6/2009 | Kang | .......................... | 296/146.9 |
| 2010/0293863 A1* | 11/2010 | Okada et al. | ................. | 49/489.1 |
| 2011/0042997 A1 | 2/2011 | Yamada et al. | | |
| 2011/0099912 A1* | 5/2011 | Ohtake et al. | ................... | 49/502 |
| 2012/0247026 A1* | 10/2012 | Sato | ............................ | 49/493.1 |

FOREIGN PATENT DOCUMENTS

JP 2010-105531 A 5/2010

OTHER PUBLICATIONS

U.S. Appl. No. 13/726,998, filed Dec. 26, 2012, Shunsuke Suzuki.

* cited by examiner

*Primary Examiner* — Jason S Morrow
(74) *Attorney, Agent, or Firm* — Buchanan Ingersoll & Rooney PC

(57) ABSTRACT

A door frame for a vehicle includes a vertical portion fixed to an upper end portion of a door body, and a main frame portion connected to an upper end of the vertical portion and fixed to the upper end portion of the door body. The vertical portion includes an envelope portion and a fixing portion. The envelope portion includes a bottom wall, an outer wall extending in an outward direction of the vehicle from an end portion of the bottom wall at an outer side of the door frame, and an inner wall extending in the outward direction from an end portion of the bottom wall at an inner side of the door frame. The bottom wall of which a width in a longitudinal direction of the vehicle is greater in a vicinity of the door body than at an upper end side of the vertical portion.

9 Claims, 5 Drawing Sheets

DOOR FRAME FOR VEHICLE

CROSS REFERENCE TO RELATED APPLICATIONS

This application is based on and claims priority under 35 U.S.C. §119 to Japanese Patent Application 2011-286720, filed on Dec. 27, 2011, the entire content of which is incorporated herein by reference.

TECHNICAL FIELD

This disclosure generally relates to a door frame for a vehicle.

BACKGROUND DISCUSSION

A known vehicle door is configured so that a door frame constituting a window frame is fixed to a door body serving as a door panel provided at a vehicle body, the door body being selectively opened and closed relative to the vehicle body. Such door frame includes a vertical portion fixed to an upper end portion of the door body and extending in an upward direction of the vehicle, and a main frame portion connected to an upper edge of the vertical portion and extending in a forward or rearward direction of the vehicle to be connected to the upper end portion of the door body. Such door frame for a vehicle is disclosed in JP2010-105531A, which will be hereinafter referred to as Reference 1.

Particularly in a case where a vehicle is driven at a high speed, a suction force is applied to the vehicle door in an outward direction of the vehicle due to a negative pressure generated by an air flow along the vehicle door. In addition, because the vertical portion is fixed to the upper end portion of the door body while extending in a vertical direction of the vehicle, the vertical portion receives a force to bend in the outward direction of the vehicle by the aforementioned suction force relative to a lower end of the vertical portion serving a fixed end. Therefore, in order to restrain a deformation of the vertical portion caused by the suction force, the vertical portion may be desirably configured so that rigidity thereof is higher at the upper end side than a vicinity of the door body.

Thus, according to the door frame disclosed in Reference 1, an envelope portion (specifically, a wide width vertical wall and a narrow width vertical wall) serving as a main portion of the vertical portion is formed so that a width of the envelope portion in a vehicle width direction gradually increases towards the door body. As a result, the rigidity of the vertical portion is higher in the vicinity of the door body than at the upper end side.

These days a further improvement of rigidity of the door frame may be required. According to configurations of Reference 1, however, the vertical portion may extend or project to an interior space of the vehicle by the increase of the width of the envelope portion in the vehicle width direction. That is, in order to fulfill the required rigidity of the door frame, the interior space may be reduced.

A need thus exists for a door frame for a vehicle which is not susceptible to the drawback mentioned above.

SUMMARY

According to an aspect of this disclosure, a door frame for a vehicle includes a vertical portion fixed to an upper end portion of a door body and extending in an upward direction of the vehicle, and a main frame portion connected to an upper end of the vertical portion and fixed to the upper end portion of the door body while extending in a forward or rearward direction of the vehicle. The vertical portion includes an envelope portion serving as a main portion of the vertical portion and opening in an outward direction of the vehicle, and a fixing portion to which a holding member is fixed for holding a glass run together with the envelope portion. The envelope portion includes a bottom wall positioned at a vehicle inner side, an outer wall extending in the outward direction of the vehicle from an end portion of the bottom wall at an outer side of the door frame, and an inner wall extending in the outward direction of the vehicle from an end portion of the bottom wall at an inner side of the door frame. The bottom wall of which a width in a longitudinal direction of the vehicle is greater in a vicinity of the door body than at an upper end side of the vertical portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
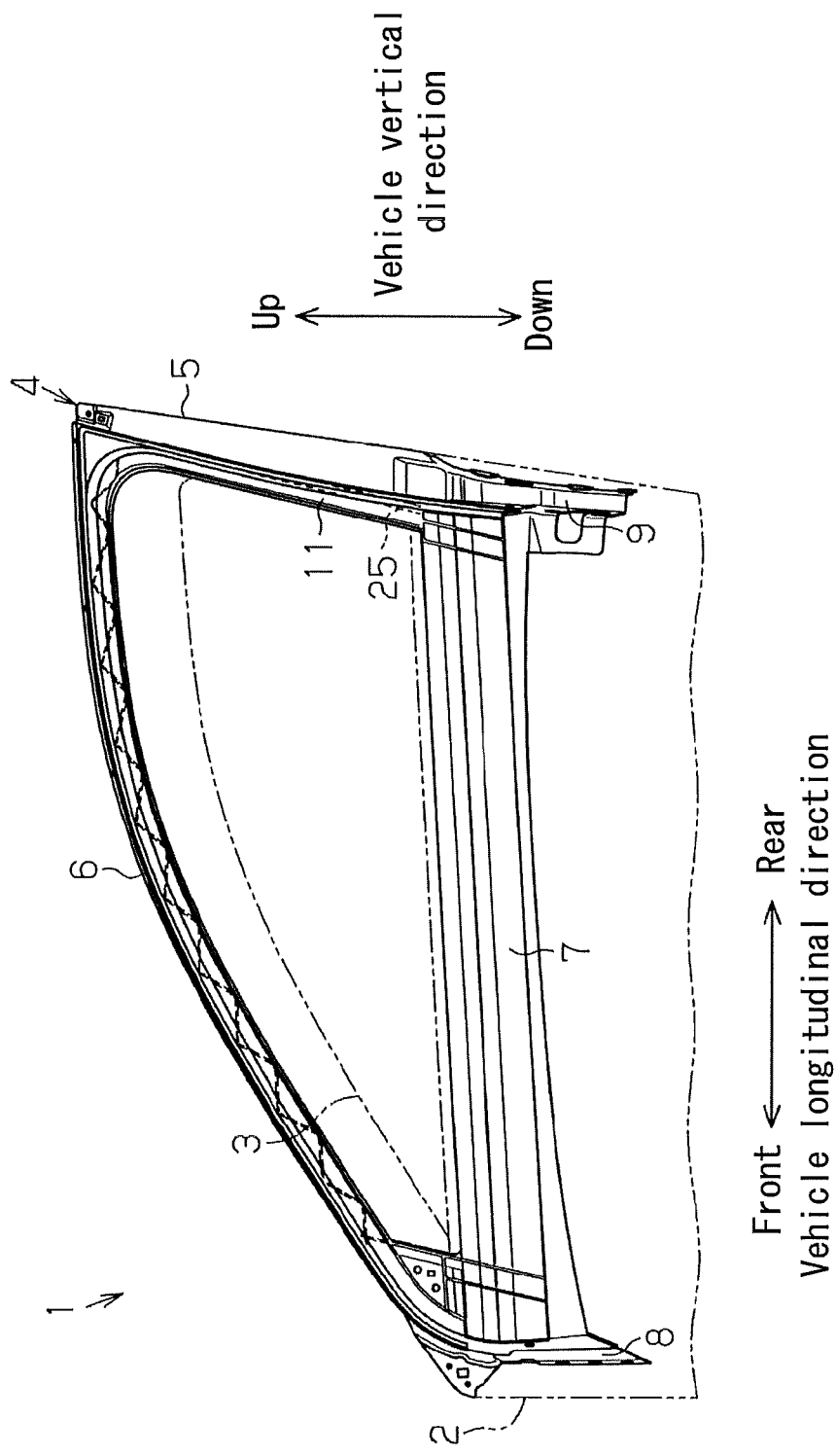
FIG. 1 is front view of a front door when viewed from a vehicle inner side according to an embodiment disclosed here.

A door frame for a vehicle according to an embodiment applied to a front door that serves as a vehicle door will be explained with reference to the attached drawings. In the embodiment, directions and orientations, i.e., front, rear, top, and bottom, for example, correspond to those of a vehicle. As illustrated in FIG. 1, a front door 1 serving as a vehicle door includes a door body 2 serving as a door panel attached to a vehicle body, the door body 2 being selectively opened and closed relative to the vehicle body. The door body 2 is formed in an envelope form including a door outer panel and a door inner panel being joined to each other. A window glass 3 is configured to selectively project and retract relative to an opening portion formed at an upper end of the door body 2.

The front door 1 also includes a door frame 4 attached to an upper end portion of the door body 2 and constituting a window frame of the front door 1, i.e., a frame of the window glass 3. The door frame 4, which is made of light alloy, i.e., aluminum alloy or magnesium alloy, for example, integrally includes a vertical portion 5 and a main frame portion 6. The vertical portion 5 is fixed to a rear end (i.e., an upper end portion) of the door body 2 while extending in an upward direction of the vehicle. The main frame portion 6, which is connected to an upper end of the vertical portion 5, is formed in a substantially arched shape to curve in a downward direction of the vehicle while extending in a forward direction of the vehicle and is fixed to a front end (i.e., the upper end portion) of the door body 2. An inner reinforcement 7 connecting respective lower ends of the vertical portion 5 and the main frame portion 6, a hinge bracket 8 provided at a front end of the inner reinforcement 7, and a lock reinforcement 9 provided at a rear end of the inner reinforcement 7 are integrally formed at the door frame 4 so that the vertical portion 5 and the main frame portion 6 of the door frame 4, for example, are reinforced. Further, equipment such as a garnish or a glass run, for example, may be assembled on the door frame 4.

Figure 2:
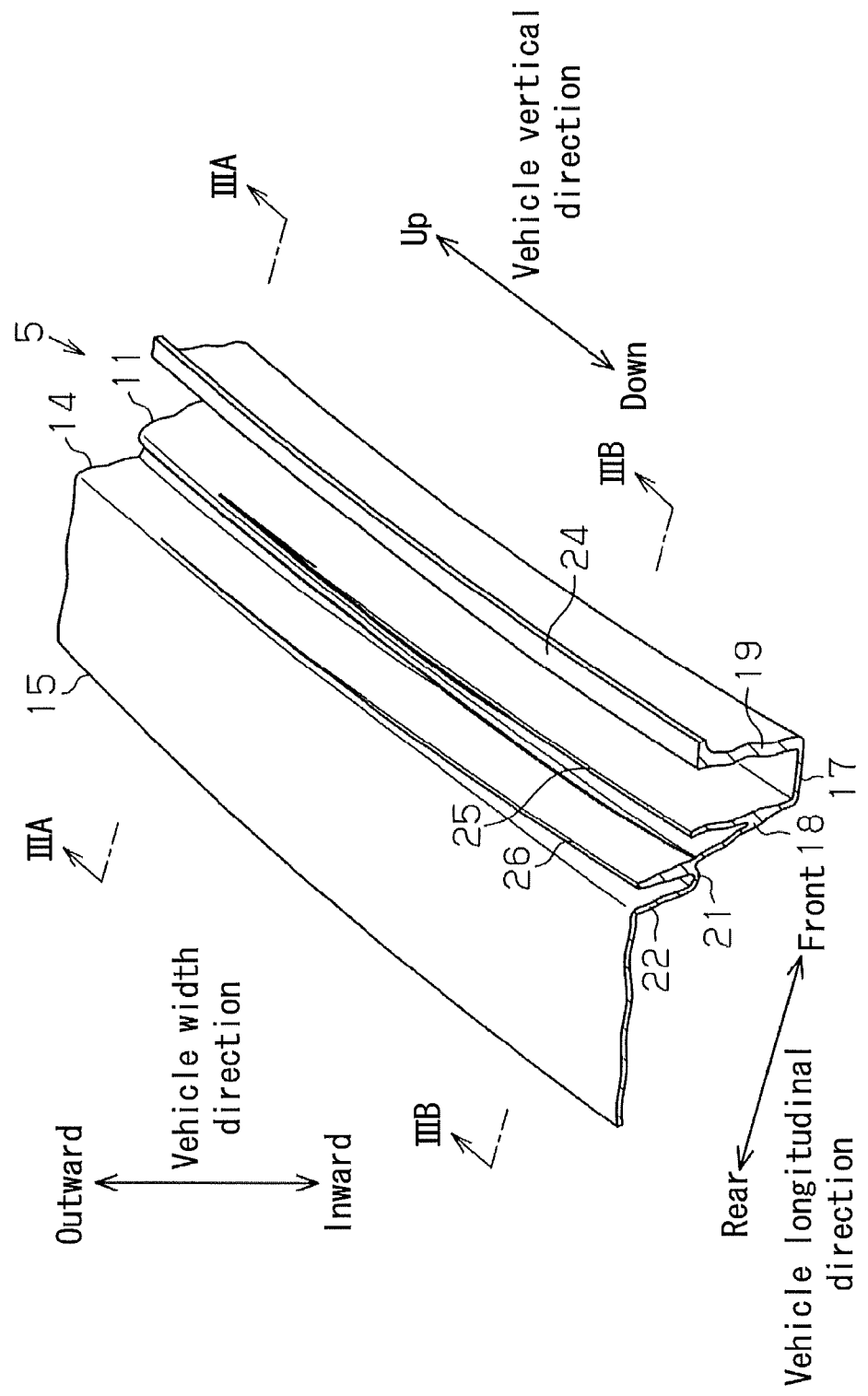
FIG. 2 is an enlarged perspective view of a vertical portion when viewed from a vehicle outer side according to the embodiment.

A configuration of the vertical portion 5 will be explained in detail. As illustrated in FIG. 2, the vertical portion 5 includes an envelope portion 11, a fixing portion 14, and a vehicle outside portion 15. The envelope portion 11 serves as a main portion of the vertical portion 5 while extending in a vertical direction of the vehicle and opening in an outward direction of the vehicle. The fixing portion 14 to which a holding member 13 (see FIG. 3) is fixed for holding a glass run 12 together with the envelope portion 11. The vehicle outside portion 15 is connected to the fixing portion 14 and is positioned at a vehicle outer side relative to the envelope portion 11.

Figure 3A:
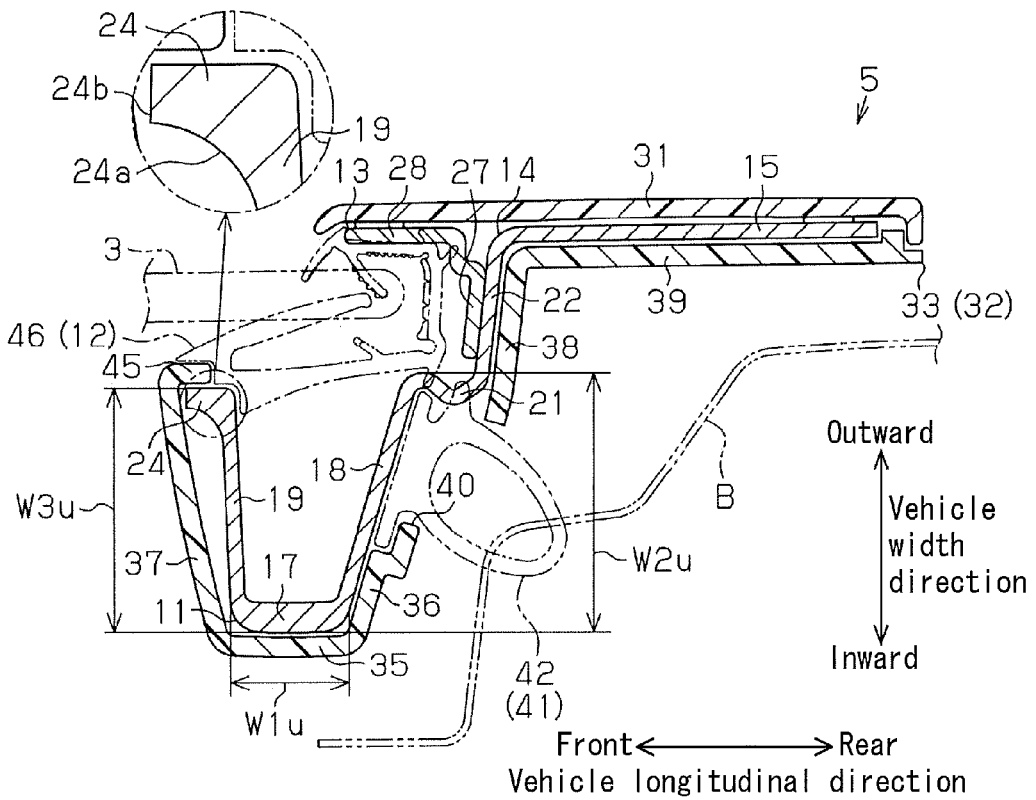
FIG. 3A is a cross-sectional view taken along line IIIA-IIIA in FIG. 2 to illustrate the vertical portion at an upper end side in a state where a garnish and a glass run, for example, are assembled on the vertical portion.
Figure 3B:
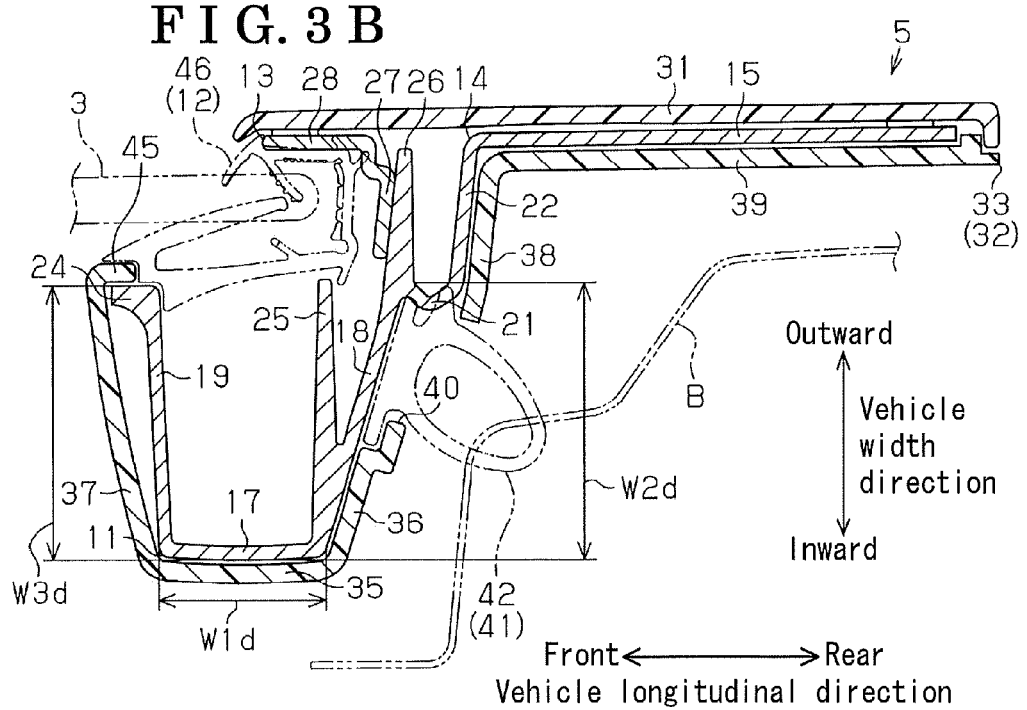
FIG. 3B is a cross-sectional view taken along line IIIB-IIIB in FIG. 2 to illustrate the vertical portion in the vicinity of a door body in a state where the garnish and the glass run, for example, are assembled on the vertical portion.

Specifically, as illustrated in FIGS. 3A and 3B, the envelope portion 11 includes a bottom wall 17, an outer wall 18, and an inner wall 19. The bottom wall 17, which is positioned at a vehicle inner side, extends in a longitudinal direction of the vehicle in a cross section. The outer wall 18 extends in the outward direction of the vehicle from an end portion of the bottom wall 17 at a vehicle rear side (i.e., at an outer side of the door frame 4) in a cross section. The inner wall 19 extends in the outward direction of the vehicle from an end portion of the bottom wall 17 at a vehicle front side (i.e., at an inner side of the door frame 4) in a cross section. That is, the envelope portion 11 is formed in an open cross section, i.e., a substantially U-shape in a cross section. The outer wall 18 is formed to slightly incline in a rearward direction of the vehicle relative to the bottom wall 17 while the inner wall 19 is formed to be substantially perpendicular to the bottom wall 17. A distance between the outer wall 18 and the inner wall 19 gradually increases towards the vehicle outer side from the bottom wall 17.

The fixing portion 14 includes a lateral wall 21 extending from an end portion of the outer wall 18 at the vehicle outer side towards the outer side of the door frame 4 and a vertical wall 22 extending from an end portion of the lateral wall 21 at the vehicle rear side (i.e., at the outer side of the door frame 4) towards the vehicle outer side. The lateral wall 21 is formed in an arc shape in a cross section to be dented towards the vehicle inner side. The vehicle outside portion 15 extends in the longitudinal direction of the vehicle in a cross section so that a width of the vehicle outside portion 15 in the longitudinal direction gradually increases towards the door body 2 from an upper end of the vertical portion 5.

The bottom wall 17 is formed so that a width of the bottom wall 17 in the longitudinal direction gradually increases towards the door body 2 from the upper end of the vertical portion 5. Specifically, a width W1$d$ of the bottom wall 17 in the longitudinal direction in the vicinity of the door body 2 as illustrated in FIG. 3B is greater than a width W1$u$ of the bottom wall 17 in the longitudinal direction at the upper end side of the vertical portion 5 as illustrated in FIG. 3A.

The outer wall 18 is formed so that a width of the outer wall 18 in a width direction of the vehicle gradually increases towards the door body 2 from the upper end of the vertical portion 5. Specifically, a width W2$d$ of the outer wall 18 in the vehicle width direction in the vicinity of the door body 2 as illustrated in FIG. 3B is greater than a width W2$u$ of the outer wall 18 in the vehicle width direction at the upper end side of the vertical portion 5 as illustrated in FIG. 3A. In the same manner, the inner wall 19 is formed so that a width of the inner wall 19 in the vehicle width direction gradually increases towards the door body 2 from the upper end of the vertical portion 5. Specifically, a width W3$d$ of the inner wall 19 in the vehicle width direction in the vicinity of the door body 2 as illustrated in FIG. 3B is greater than a width W3$u$ of the inner wall 19 in the vehicle width direction at the upper end side of the vertical portion 5 as illustrated in FIG. 3A.

Further, as illustrated by an enlarged view in FIG. 3A, an extension portion 24 is formed at an end portion of the inner wall 19 at the vehicle outer side so as to extend in the forward direction of the vehicle (i.e., at the inner side of the door frame 4). An end surface of the end portion of the inner wall 19 at the vehicle outer side and an end surface of the extension portion 24 at the vehicle outer side are formed to be coplanar to each other. The extending amount of the extension portion 24 in the forward direction of the vehicle gradually increases towards the vehicle outer side. Specifically, an inner side surface 24$a$ of the extension portion 24 is formed in an arc shape gradually getting closer to the inner wall 19 from a front end surface 24$b$ towards the vehicle inner side. The extension portion 24 is formed in a constant cross section over an entire vertical direction of the vertical portion 5.

As illustrated in FIGS. 2, 3A and 3B, a first rib (an envelope portion rib) 25 is formed at the envelope portion 11 by projecting from the outer wall 18 to the vehicle outer side. Specifically, the first rib 25 is branched from a portion of the outer wall 18 so as to extend in the vertical direction of the vehicle while a distance between the first rib 25 and the inner wall 19 in the longitudinal direction of the vehicle is constant. That is, the first rib 25 and the outer wall 18 are integrated or united at an upper side of the vehicle. In addition, the first rib 25 is formed so that a distance from the bottom wall 17 to an end portion of the first rib 25 at the vehicle outer side is substantially the same as a distance from the bottom wall 17 to the end portion of the outer wall 18 at the vehicle outer side.

A second rib (a fixing portion rib) 26 is formed at the fixing portion 14 by projecting from the lateral wall 21 to the vehicle outer side. The second rib 26 is branched from a portion of the vertical wall 22 so as to extend in the vertical direction of the vehicle while a distance between the second rib 26 and the inner wall 19 in the longitudinal direction of the vehicle is constant. In addition, the second rib 26 is formed to separate or divide the lateral wall 21 between a vehicle front side portion and a vehicle rear side portion. That is, the second rib 26 is integrated or united with the vertical wall 22 at the upper side of the vehicle. In addition, the second rib 26 is formed so that a distance from the lateral wall 21 to an end portion of the second rib 26 at the vehicle outer side is substantially the same as a distance from the lateral wall 21 to an end portion of the vertical wall 22 at the vehicle outer side.

As illustrated in FIGS. 3A and 3B, the holding member 13 includes a fixed portion 27 extending in the vehicle width direction and a holding portion 28 extending in the forward direction of the vehicle from an end portion of the fixed portion 27 at the vehicle outer side in a cross section. The holding member 13 is formed in a substantially L-shape in a cross section. The holding member 13 is formed by rolling of a metal plate, for example. The holding member 13 is formed in a constant cross section over an entire longitudinal direction thereof. The fixed portion 27 of the holding member 13 is fixed to the second rib 26 and an upper portion of the vertical wall 22 (i.e., an upper portion than a position at which the second rib 26 is branched from the vertical wall 22) by welding, for example.

An outer garnish 31 is attached to the vertical portion 5 so as to cover the vertical portion 5 from the vehicle outer side. The outer garnish 31 is formed by a plate member made of synthetic resin, for example. The outer garnish 31, which extends in the vehicle longitudinal direction in a cross section, covers the vehicle outside portion 15 of the vertical portion 5 and the holding portion 28 of the holding member 13. An inner garnish 32 is also attached to the vertical portion 5 so as to cover the vertical portion 5 from the vehicle inner side. The inner garnish 32 is formed by a plate member made of synthetic resin, for example.

The inner garnish 32 integrally includes a vertical portion covering portion 33 covering the vertical portion 5 and a main frame covering portion covering the main frame portion 6. The vertical portion covering portion 33 integrally includes a bottom wall covering portion 35 covering the bottom wall 17 of the envelope portion 11, an outer wall covering portion 36 extending to the vehicle outer side from an end portion of the bottom wall covering portion 35 at the vehicle rear side (i.e., at the outer side of the door frame 4) to cover the outer wall 18, and an inner wall covering portion 37 extending to the vehicle outer side from an end portion of the bottom wall covering portion 35 at the vehicle front side (i.e., at the inner side of the door frame 4) to cover the inner wall 19.

A fixing portion covering portion 38 and a vehicle outside portion covering portion 39 are integrally formed at an end portion of the outer wall covering portion 36 at the vehicle outer side. The fixing portion covering portion 38 further extends to the vehicle outer side to cover the fixing portion 14. The vehicle outside portion covering portion 39 extends to the vehicle rear side from an end portion of the fixing portion covering portion 38 at the vehicle outer side to cover the vehicle outside portion 15. An engagement opening 40 is formed at the outer wall covering portion 36 so as to extend in the vertical direction of the vehicle. A weather strip 41 is arranged within the engagement opening 40 to elastically make contact with an opening portion B of the vehicle body to thereby restrain water from entering a vehicle interior. The weather strip 41, which is made of rubber material, for example, integrally includes a vertical portion attachment portion 42 attached to the vertical portion 5 and a main frame attachment portion attached to the main frame portion 6. Each of the vertical portion attachment portion 42 and the main frame attachment portion is formed in a constant cross section over an entire longitudinal direction thereof.

An end portion of the inner wall covering portion 37 at the vehicle outer side is bent in the rearward direction of the vehicle to form a protruding portion 45. The protruding portion 45 engages with the extension portion 24 of the inner wall 19. The glass run 12 that elastically makes contact with the window glass 3 engages with the holding portion 28 of the holding member 13, an upper portion of the lateral wall 21 (i.e., an upper portion than a position at which the first rib 25 is branched from the outer wall 18), the end portion of the first rib 25 at the vehicle outer side, the end portion of the inner wall 19 at the vehicle outer side, and the protruding portion 45 of the inner garnish 32 so as to be attached to the vertical portion 5. The glass run 12, which is made of rubber material, for example, integrally includes a vertical portion attachment portion 46 attached to the vertical portion 5 and a main frame attachment portion attached to the main frame portion 6. Each of the vertical portion attachment portion 46 and the main frame attachment portion is formed in a constant cross section over an entire longitudinal direction thereof.

Figure 4:
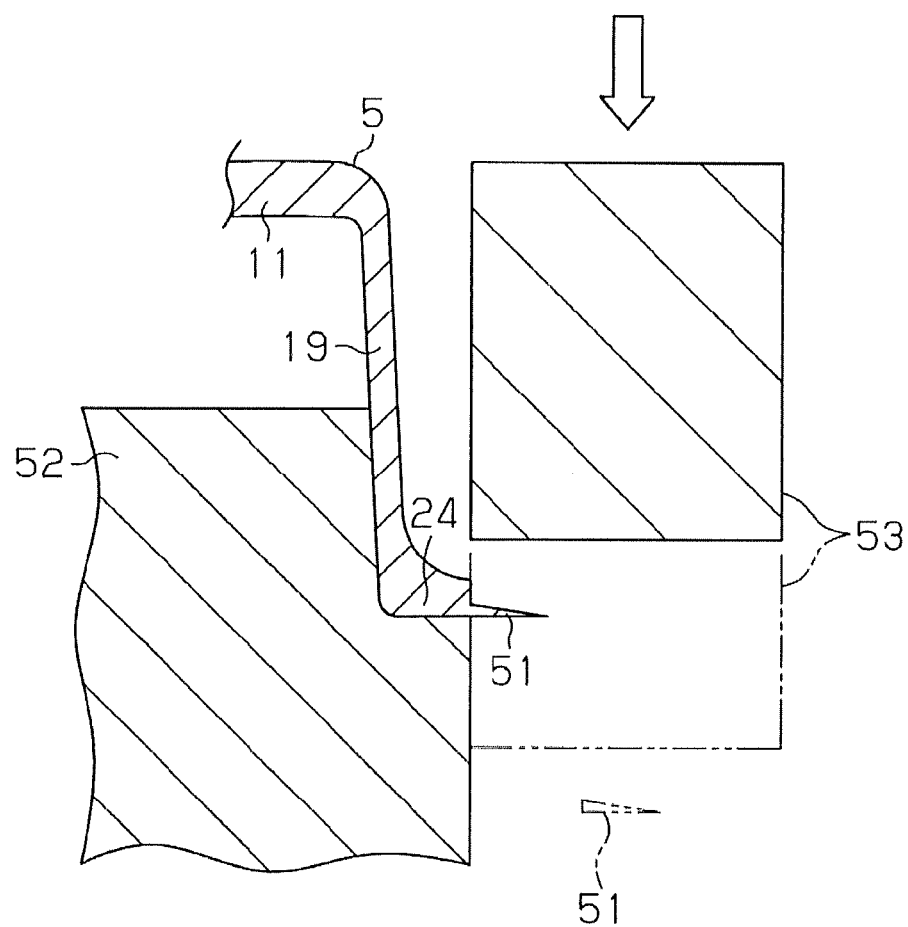
FIG. 4 is a schematic view illustrating a vicinity of an end portion of an inner wall at a vehicle outer side in a case of removing a burr.

A method of manufacturing the door frame 4 will be explained below. The vertical portion 5, the main frame portion 6, the inner reinforcement 7, the hinge bracket 8, and the lock reinforcement 9 are integrally formed by light alloy die-casting to obtain the door frame 4. At this time, as illustrated in FIG. 4, a burr 51 is formed at the end portion of the inner wall 19 at the vehicle outer side while projecting towards the inner side of the door frame 4. Thus, according to the present embodiment, after the door frame 4 is removed from a die cast mold, the end portion of the inner wall 19 at the vehicle outer side and the extension portion 24 are brought to contact a support 52 to thereby secure the vertical portion 5. Then, the burr 51 is sheared by a jig 53 to be removed from the inner wall 19. A burr formed at the main frame portion 6 is removed in the same way. Next, after the holding member 13 is fixed to the door frame 4, the outer garnish 31 and the inner garnish 32 are attached to the door frame 4.

Figure 5:
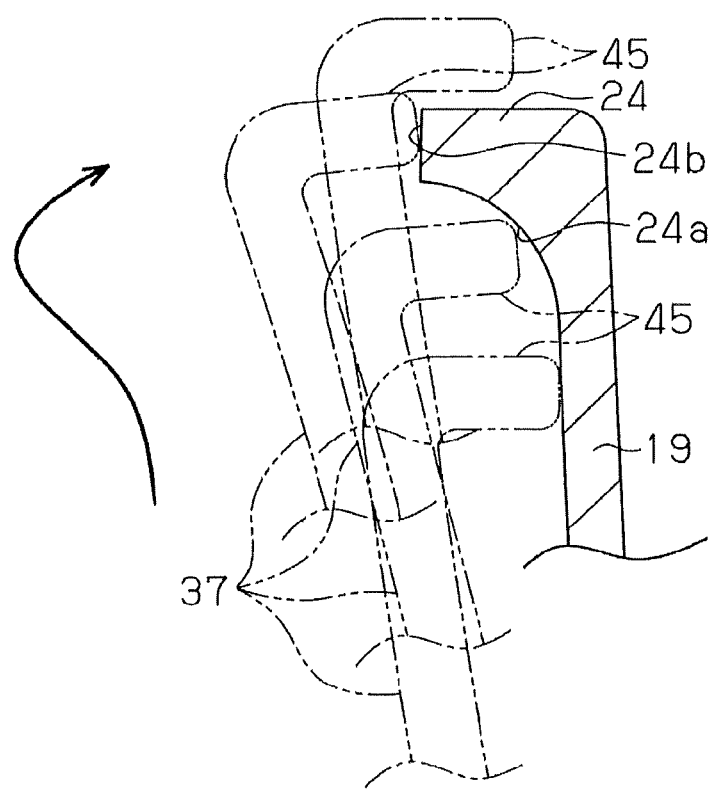
FIG. 5 is a schematic view illustrating the vicinity of the end portion of the inner wall at the vehicle outer side in a case of attaching an inner garnish.

At this time, the inner garnish 32 is attached to the vertical portion 5 by being pressed against the inner wall 19 from the vehicle inner side so that the protruding portion 45 moves along the inner wall 19. Specifically, because the extension portion 24 is formed so that the extending amount thereof gradually increases towards the vehicle front side as illustrated in FIG. 5, the protruding portion 45 moves along the inner wall 19 beyond the inner side surface 24a and the front end surface 24b of the extension portion 24 to engage with the extension portion 24. The vertical portion covering portion 33 of the inner garnish 32 is attached to the vertical portion 5 accordingly. Thereafter, the glass run 12 and the whether strip 41 are attached to the door frame 4.

According to the aforementioned embodiment, the bottom wall 17 is formed so that the width thereof in the vehicle longitudinal direction is greater in the vicinity of the door body 2 than the upper end side of the vertical portion 5 to thereby improve a rigidity of the vertical portion 5. Even in a case where the width of the bottom wall 17 varies in the vehicle longitudinal direction, the vertical portion 5 is inhibited from projecting to an interior space of the vehicle, which restrains the interior space from being narrowed in the vehicle width direction. Consequently, while the interior space is being ensured, the rigidity of the vertical portion 5 is improved.

In addition, according to the aforementioned embodiment, each of the outer wall 18 and the inner wall 19 is formed so that the width in the vehicle width direction is greater in the vicinity of the door body 2 than at the upper end side of the vertical portion 5 to thereby improve the rigidity of the vertical portion 5.

Further, according to the aforementioned embodiment, the first rib 25 is formed to extend from the outer wall 18 to the vehicle outer side at the envelope portion 11, which achieves the improved rigidity of the vertical portion 5. The first rib 25 is formed to be branched from a portion of the outer wall 18 to extend in the vertical direction of the vehicle so that the distance from the inner wall 19 in the longitudinal direction of the vehicle is constant. In addition, the glass run 12 is configured to engage with the end portion of the first rib 25 at the vehicle outer side. Thus, without a member for holding the glass run 12, the glass run 12 formed in a constant cross section may be stably held or maintained at the vertical portion 5 (the door frame 4). According to the configuration of the present embodiment where the distance of the bottom wall 17 in the vehicle longitudinal direction is greater in the vicinity of the door body 2, the distance between the bottom wall 17 and the outer wall 18 in the vehicle longitudinal direction is greater in the vicinity of the door body 2. Thus, an effect of the glass run 12 that is engageable with the first rib 25 is large.

Furthermore, according to the aforementioned embodiment, the fixing portion 14 includes the lateral wall 21 extending from the end portion of the outer wall 18 at the vehicle outer side towards the outer side of the door frame 4, and the vertical wall 22 extending from the end portion of the lateral wall 21 at the vehicle rear side (the outer side of the door frame 4) towards the vehicle outer side. Then, the second rib 26 is formed at the fixing portion 14 so as to project towards the vehicle outer side and to extend in the vertical direction of the vehicle so that the distance from the inner wall 19 in the longitudinal direction of the vehicle is constant, which results in a further improvement of the rigidity of the vertical portion 5. Because the second rib 26 is formed so that the distance from the inner wall 19 is constant in the vehicle longitudinal direction, the glass run 12 formed in the constant cross section may be held by the holding member 13 formed in the constant cross section, without a spacer, for example, formed at the second rib 26.

Furthermore, according to the aforementioned embodiment, the extension portion 24 is formed at the end portion of the inner wall 19 at the vehicle outer side. Thus, in a case to remove the burr 51 formed upon molding of the door frame 4 by die-casting, the vertical portion 5 may be stably supported at the support 52 to thereby effectively perform the removal of the burr.

Furthermore, according to the aforementioned embodiment, the extension portion 24 is formed so that the extending amount in the forward direction of the vehicle gradually increases towards the vehicle outer side. Accordingly, the inner garnish 32 may be easily attached to the door frame 4 by being pressed against the door frame 4 from the vehicle inner side, which may result in an improved assembly performance. In addition, because the protruding portion 45 engages with the extension portion 24, the inner garnish 32 may be firmly fixed to the main frame portion 6.

The aforementioned embodiment may be appropriately modified or changed. For example, according to the embodiment, the inner side surface 24*a* of the extension portion 24 is formed in an arc shape. Alternatively, the inner side surface 24*a* may be linearly formed to gradually get closer to the inner wall 19. Further alternatively, the inner side surface 24*a* may be formed to be substantially perpendicular to the inner wall 19 so that the extending amount of the extension portion 24 rapidly increases towards the vehicle outer side.

The extension portion 24 may not be formed at the end portion of the inner wall 19 at the vehicle outer side. The first rib 25 may be formed so that the glass run 12 is inhibited from engaging with the end portion of the first rib 25 at the vehicle outer side.

According to the aforementioned embodiment, the first rib 25 is branched from a portion of the outer wall 18. Alternatively, the first rib 25 may be formed to be entirely spaced away from both the outer wall 18 and the inner wall 19. Further alternatively, the distance between the first rib 25 and the inner wall 19 may not be constant. For example, plural first ribs 25 may be formed at the envelope portion 11, the plural first ribs 25 being arranged in a zigzag pattern. Further alternatively, the first rib 25 may not be formed.

According to the aforementioned embodiment, the second rib 26 is branched from a portion of the vertical wall 22, and the lateral wall 21 is separated or divided into the vehicle front side portion and the vehicle rear side portion. Alternatively, for example, the second rib 26 may be formed to be entirely spaced away from the vertical wall 22. Further alternatively, the second rib 26 may not be formed.

According to the aforementioned embodiment, the width of the bottom wall 17 in the longitudinal direction of the vehicle gradually increases from the upper end side of the vertical portion 5 towards the door body 2. Alternatively, for example, the width of the bottom wall 17 in the longitudinal direction of the vehicle may increase stepwisely. In the same way, the width of each of the outer wall 18 and the inner wall 19 in the vehicle width direction may increase stepwisely from the upper end side of the vertical portion 5 towards the door body 2. Alternatively, the width of each of the outer wall 18 and the inner wall 19 in the vehicle width direction may be constant along the vertical direction of the vehicle.

According to the aforementioned embodiment, the outer garnish 31 and the inner garnish 32 are made of synthetic resin. Alternatively, the outer garnish 31 and the inner garnish 32 may be made of rubber or metal. In addition, the door frame 4 may be made of iron, for example, instead of light alloy.

According to the aforementioned embodiment, the vertical portion 5, the main frame portion 6, the inner reinforcement 7, the hinge bracket 8, and the lock reinforcement 9 are integrally formed by light alloy die-casting. Alternatively, the aforementioned portions may be separately formed and then connected to one another by welding, for example.

The inner reinforcement 7, the hinge bracket 8, and the lock reinforcement 9 may not be formed at the door frame 4. In addition, the door frame 4 may be formed by cutting, for example, instead of die-casting.

The door frame 4 of the present embodiment may be applied to a door frame for a rear door of a vehicle besides the front door 1.

According to the aforementioned embodiment, the door frame 4 (a door frame for a vehicle) that improves the rigidity of the vertical portion 5 is provided while the interior space of the vehicle is ensured.

According to the aforementioned embodiment, the width of the bottom wall 17 in the longitudinal direction of the vehicle is greater in the vicinity of the door body 2 than the upper end side of the vertical portion 5, which results in an improvement of the rigidity of the vertical portion 5. Even when the width of the bottom wall 17 in the longitudinal direction of the vehicle varies, the vertical portion 5 is inhibited from projecting to the interior space of the vehicle, thereby inhibiting the interior space from decreasing in the width direction of the vehicle. The rigidity of the vertical portion 5 is improved while the interior space of the vehicle is ensured.

According to the aforementioned embodiment, each of the outer wall 18 and the inner wall 19 is formed so that the width in the width direction of the vehicle is greater in the vicinity of the door body 2 than at the upper end side of the vertical portion 5.

Accordingly, in addition to the width of the bottom wall 17 in the longitudinal direction of the vehicle, the width of each of the outer wall 18 and the inner wall 19 in the width direction of the vehicle is greater in the vicinity of the door body 2 than the upper end side of the vertical portion 5. Thus, the rigidity of the vertical portion 5 may be sufficiently improved.

According to the aforementioned embodiment, the envelope portion 11 includes the first rib 25 formed to project in the outward direction of the vehicle.

Accordingly, the rigidity of the vertical portion 5 may be further improved.

According to the aforementioned embodiment, the first rib 25 extends in the vertical direction of the vehicle while maintaining a constant distance from the inner wall 18, and the glass run 12 engages with the end portion of the first rib 25 at the vehicle outer side.

Accordingly, the glass run 12 formed in a constant cross section may be stably held or maintained at the door frame 4.

According to the aforementioned embodiment, the fixing portion 14 includes the lateral wall 21 extending from the end portion of the outer wall 18 at the vehicle outer side towards the outer side of the door frame 4 and the vertical wall 22 extending from the end portion of the lateral wall 21 at the outer side of the door frame 4 towards the vehicle outer side. The fixing portion 14 includes the second rib 26 formed to project to the vehicle outer side and extending in the vertical direction of the vehicle while maintaining a constant distance from the inner wall 19.

Accordingly, the second rib 26 formed at the fixing portion 14 may further improve the rigidity of the vertical portion 5. In addition, because the second rib 26 is formed so that the distance from the inner wall 19 in the longitudinal direction of the vehicle is constant, the glass run 12 having a constant cross section may be held by the holding member 13 having a constant cross section, without a spacer formed at the second rib 26, for example.

According to the aforementioned embodiment, the vertical portion 5 is formed by die-casting and the extension portion 24 is formed at the end portion of the inner wall 19 at the vehicle outer side to extend to the outer side of the door frame 4.

In order to form the vertical portion 5 by die-casting, the burr 51 may be generally formed at the end portion of the inner wall 19 at the vehicle outer side to project to the inner side of the door frame 4. The burr 51 is removed from the inner wall 19 by being sheared with a usage of the jig 53 with the vertical portion 5 being fixed in a state where the end portion of the inner wall 19 at the vehicle outer side is in contact with the support 52. Accordingly, because the extension portion 24 is formed at the end portion of the inner wall 19 at the vehicle outer side, the vertical portion 5 is stably supported at the support 52 to thereby efficiently remove the burr 51.

According to the aforementioned embodiment, the inner garnish 32 is attached to the vertical portion 5 to cover the vertical portion 5 from the vehicle inner side, the inner garnish 32 including the protruding portion 45 engaging with the extension portion 24. The extension portion 24 is formed in a state where the extending amount of the extension portion 24 to the inner side of the door frame 4 gradually increases towards the vehicle outer side.

The inner garnish 32 is pressed against the vertical portion 5 from the vehicle inner side so that the protruding portion 45 moves along the inner wall 19. Then, the inner garnish 32 deforms so that the protruding portion 45 moves beyond the extension portion 24 to engage therewith. The inner garnish 32 is pressed against the vertical portion 5 so as to be easily attached to the vertical portion 5, which may lead to an improved assembly performance. Further, because the protruding portion 45 engages with the extension portion 24, the inner garnish 32 may be securely fixed to the vertical portion 5.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A door frame for a vehicle, comprising:
    a vertical portion fixed to an upper end portion of a door body and extending in an upward direction of the vehicle;
    a main frame portion connected to an upper end of the vertical portion and fixed to the upper end portion of the door body while extending in a forward or rearward direction of the vehicle;
    the vertical portion including an envelope portion serving as a main portion of the vertical portion and opening in an outward direction of the vehicle, and a fixing portion to which a holding member is fixed for holding a glass run together with the envelope portion,
    the envelope portion including a bottom wall positioned at a vehicle inner side, an outer wall extending in the outward direction of the vehicle from an end portion of the bottom wall at an outer side of the door frame, and an inner wall extending in the outward direction of the vehicle from an end portion of the bottom wall at an inner side of the door frame, and
    the bottom wall of which a width in a longitudinal direction of the vehicle is greater in a vicinity of the door body than at an upper end side of the vertical portion.

2. The door frame according to claim 1, wherein each of the outer wall and the inner wall is formed so that a width in a width direction of the vehicle is greater in the vicinity of the door body than at the upper end side of the vertical portion.

3. The door frame according to claim 1, wherein the envelope portion includes a first rib formed to project in the outward direction of the vehicle.

4. The door frame according to claim 2, wherein the envelope portion includes a first rib formed to project in the outward direction of the vehicle.

5. The door frame according to claim 3, wherein the first rib extends in a vertical direction of the vehicle while maintaining a constant distance from the inner wall, and the glass run engages with an end portion of the first rib at a vehicle outer side.

6. The door frame according to claim 4, wherein the first rib extends in a vertical direction of the vehicle while maintaining a constant distance from the inner wall, and the glass run engages with an end portion of the first rib at a vehicle outer side.

7. The door frame according to claim 1, wherein the fixing portion includes a lateral wall extending from an end portion of the outer wall at a vehicle outer side towards the outer side of the door frame and a vertical wall extending from an end portion of the lateral wall at the outer side of the door frame towards the vehicle outer side, and wherein the fixing portion includes a second rib formed to project to the vehicle outer side and extending in a vertical direction of the vehicle while maintaining a constant distance from the inner wall.

8. The door frame according to claim 1, wherein the vertical portion is formed by die-casting and an extension portion is formed at an end portion of the inner wall at a vehicle outer side to extend to the inner side of the door frame.

9. The door frame according to claim 8, wherein an inner garnish is attached to the vertical portion to cover the vertical portion from the vehicle inner side, the inner garnish including a protruding portion engaging with the extension portion, and wherein the extension portion is formed in a state where an extending amount of the extension portion to the inner side of the door frame gradually increases towards the vehicle outer side.

* * * * *